US012792268B2

(12) United States Patent
Betz et al.

(10) Patent No.: US 12,792,268 B2
(45) Date of Patent: Nov. 10, 2026

(54) MEMORY DEVICES INCLUDING IDLE TIME PREDICTION

(71) Applicant: MICRON TECHNOLOGY, INC., Boise, ID (US)

(72) Inventors: Tyler L. Betz, Meridian, ID (US); Sundararajan N. Sankaranarayanan, Fremont, CA (US); Roberto Izzi, Caserta (IT); Massimo Zucchinali, Torre Boldone (IT); Xiangyu Tang, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 34 days.

(21) Appl. No.: 18/906,236

(22) Filed: Oct. 4, 2024

(65) Prior Publication Data

US 2025/0028487 A1 Jan. 23, 2025

Related U.S. Application Data

(62) Division of application No. 17/949,333, filed on Sep. 21, 2022, now Pat. No. 12,124,739.

(60) Provisional application No. 63/402,186, filed on Aug. 30, 2022.

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0679* (2013.01)

(58) Field of Classification Search
CPC .... G06F 3/0659; G06F 3/0604; G06F 3/0634; G06F 3/0679; G06F 1/3225; G06F 1/3275; G06F 3/0625
See application file for complete search history.

(56) References Cited

U.S. PATENT DOCUMENTS

| | | | | |
|---|---|---|---|---|
| 9,001,608 | B1 | 4/2015 | Chishti et al. | |
| 11,568,940 | B2 | 1/2023 | Vali et al. | |
| 2015/0121057 | A1* | 4/2015 | Arora | G06F 1/3287 713/100 |
| 2017/0115723 | A1* | 4/2017 | Shurin | G06F 1/3287 |
| 2020/0409597 | A1* | 12/2020 | Ganesh | G06F 3/0659 |
| 2022/0229566 | A1* | 7/2022 | Benisty | G06F 3/0653 |
| 2022/0392546 | A1* | 12/2022 | Yu | G11C 5/14 |
| 2023/0063280 | A1 | 3/2023 | Kim | |

* cited by examiner

*Primary Examiner* — Zhuo H Li
(74) *Attorney, Agent, or Firm* — Dicke, Billig & Czaja, PLLC

(57) ABSTRACT

A memory device includes an interface to communicate with a host, an array of memory cells, and a controller. The controller is configured to access the array of memory cells in response to commands from the host. The controller is further configured to enter an idle time in response to no commands from the host with queue empty, receive a first command from the host, and exit the idle time in response receiving a second command from the host. The controller is further configured to for a plurality of idle times, generate a history indicating a length of each idle time. The controller is further configured to predict the length of a subsequent idle time based on the history.

19 Claims, 16 Drawing Sheets

MEMORY DEVICES INCLUDING IDLE TIME PREDICTION

RELATED APPLICATIONS

This Application is a Divisional of U.S. application Ser. No. 17/949,333, titled "MEMORY DEVICES INCLUDING IDLE TIME PREDICTION," filed Sep. 21, 2022 which issued as U.S. Pat. No. 12,124,739 on Oct. 22, 2024, which claims the benefit of U.S. Provisional Application No. 63/402,186, filed on Aug. 30, 2022, which are hereby incorporated in their entirety by reference.

TECHNICAL FIELD

The present disclosure relates generally to memory and, in particular, in one or more embodiments, the present disclosure relates to predicting idle times within memory devices to reduce latency and power consumption.

BACKGROUND

Memories (e.g., memory devices) are typically provided as internal, semiconductor, integrated circuit devices in computers or other electronic devices. There are many different types of memory including random-access memory (RAM), read only memory (ROM), dynamic random access memory (DRAM), synchronous dynamic random access memory (SDRAM), and flash memory.

Flash memory has developed into a popular source of non-volatile memory for a wide range of electronic applications. Flash memory typically use a one-transistor memory cell that allows for high memory densities, high reliability, and low power consumption. Changes in threshold voltage (Vt) of the memory cells, through programming (which is often referred to as writing) of charge storage structures (e.g., floating gates or charge traps) or other physical phenomena (e.g., phase change or polarization), determine the data state (e.g., data value) of each memory cell. Common uses for flash memory and other non-volatile memory include personal computers, personal digital assistants (PDAs), digital cameras, digital media players, digital recorders, games, appliances, vehicles, wireless devices, mobile telephones, and removable memory modules, and the uses for non-volatile memory continue to expand.

A NAND flash memory is a common type of flash memory device, so called for the logical form in which the basic memory cell configuration is arranged. Typically, the array of memory cells for NAND flash memory is arranged such that the control gate of each memory cell of a row of the array is connected together to form an access line, such as a word line. Columns of the array include strings (often termed NAND strings) of memory cells connected together in series between a pair of select gates, e.g., a source select transistor and a drain select transistor. Each source select transistor might be connected to a source, while each drain select transistor might be connected to a data line, such as a column bit line. Variations using more than one select gate between a string of memory cells and the source, and/or between the string of memory cells and the data line, are known.

In an active state of a memory device, a host may issue read and write commands to the memory device to be processed by the memory device. If a host currently does not need to access the memory device for read or write operations, the host may issue a command to the memory device to enter an idle time. With the idle time entered, the host may command the memory device to exit the idle time and return to the active state or command the memory device to transition to a hibernate or sleep state. During the idle time, the memory device may perform background operations (e.g., garbage collection). The memory device may transition power states during the idle time to reduce power consumption, but there is a tradeoff between reduced response latency and reduced power consumption.

DETAILED DESCRIPTION

Figure 1:
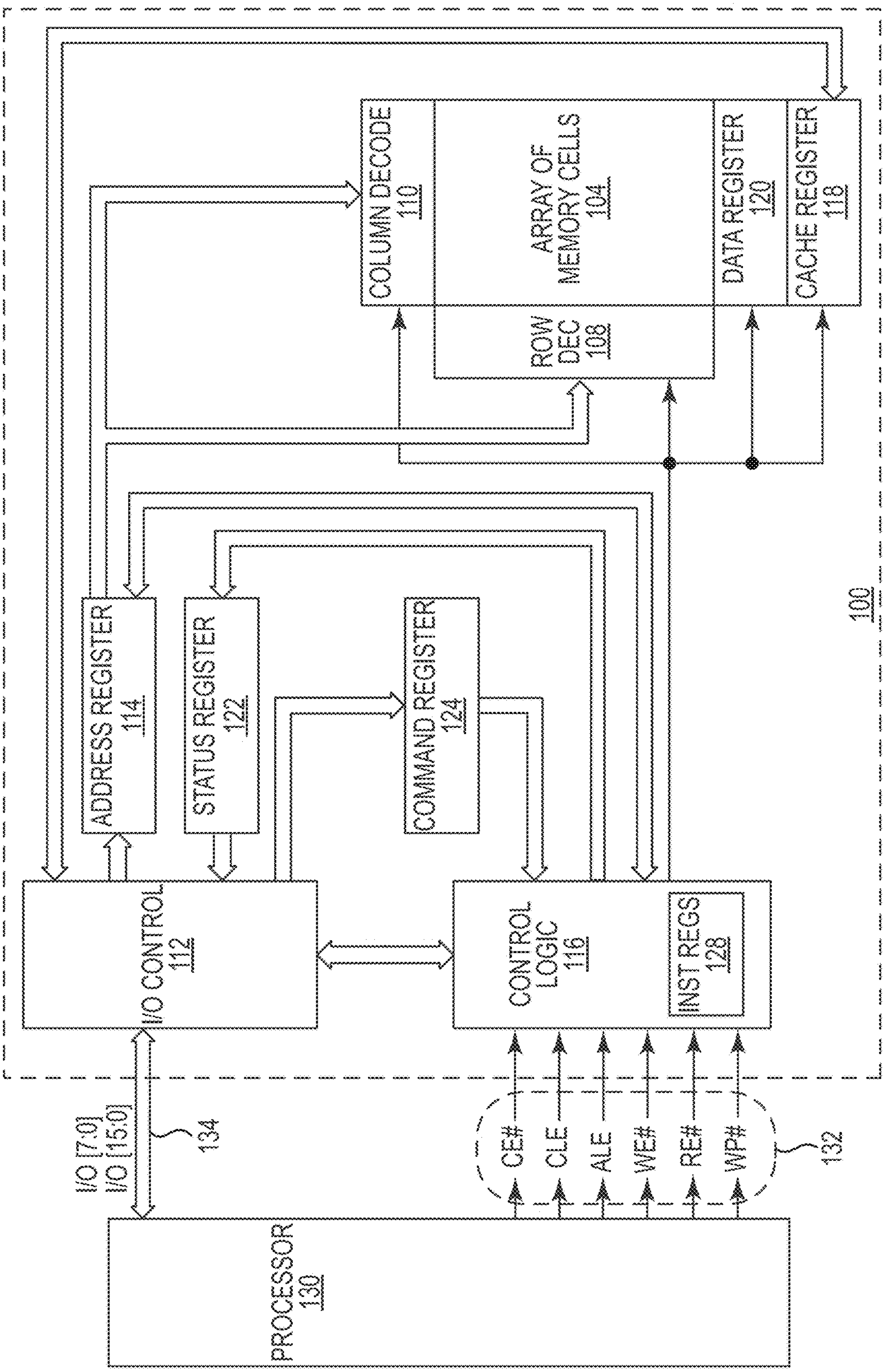
FIG. 1 is a simplified block diagram of a memory in communication with a processor as part of an electronic system, according to an embodiment.

In the following detailed description, reference is made to the accompanying drawings that form a part hereof, and in which is shown, by way of illustration, specific embodiments. In the drawings, like reference numerals describe substantially similar components throughout the several views. Other embodiments may be utilized and structural, logical and electrical changes may be made without departing from the scope of the present disclosure. The following detailed description is, therefore, not to be taken in a limiting sense.

The term "conductive" as used herein, as well as its various related forms, e.g., conduct, conductively, conducting, conduction, conductivity, etc., refers to electrically conductive unless otherwise apparent from the context. Similarly, the term "connecting" as used herein, as well as its various related forms, e.g., connect, connected, connection, etc., refers to electrically connecting by a conductive path unless otherwise apparent from the context.

It is recognized herein that even where values might be intended to be equal, variabilities and accuracies of industrial processing and operation might lead to differences from their intended values. These variabilities and accuracies will generally be dependent upon the technology utilized in fabrication and operation of the integrated circuit device. As such, if values are intended to be equal, those values are deemed to be equal regardless of their resulting values.

AND memory is widely used in managed NAND (MNAND) and Solid-State Drive (SSD) systems. Common examples of MNAND might include embedded MultiMediaCard (eMMC) as might be common in SSD systems, embedded USB (eUSB) as might be common in industrial applications, and Universal Flash Storage (UFS) as might be common in digital cameras, mobile phones and other consumer electronic devices. For mobile applications, the battery life of a system may be improved by reducing the power consumption of the memory device during idle times. Reducing the power consumption during idle times, however, may increase response latency, thereby negatively effecting user experience. Accordingly, disclosed herein are power management schemes that may optimize power consumption while minimizing response latency of an idle memory device, thereby improving user experience through both reduced latency and extended battery life.

FIG. 1 is a simplified block diagram of a first apparatus, in the form of a memory (e.g., memory device) 100, in communication with a second apparatus, in the form of a processor 130, as part of a third apparatus, in the form of an electronic system, according to an embodiment. Some examples of electronic systems include personal computers, personal digital assistants (PDAs), digital cameras, digital media players, digital recorders, games, appliances, vehicles, wireless devices, mobile telephones and the like. The processor 130, e.g., a controller external to the memory device 100, might be a memory controller or other external host device.

Memory device 100 includes an array of memory cells 104 that might be logically arranged in rows and columns. Memory cells of a logical row are typically connected to the same access line (commonly referred to as a word line) while memory cells of a logical column are typically selectively connected to the same data line (commonly referred to as a bit line). A single access line might be associated with more than one logical row of memory cells and a single data line might be associated with more than one logical column. Memory cells (not shown in FIG. 1) of at least a portion of array of memory cells 104 are capable of being programmed to one of at least two target data states.

A row decode circuitry 108 and a column decode circuitry 110 are provided to decode address signals. Address signals are received and decoded to access the array of memory cells 104. Memory device 100 also includes input/output (I/O) control circuitry 112 to manage input of commands, addresses and data to the memory device 100 as well as output of data and status information from the memory device 100. An address register 114 is in communication with I/O control circuitry 112 and row decode circuitry 108 and column decode circuitry 110 to latch the address signals prior to decoding. A command register 124 is in communication with I/O control circuitry 112 and control logic 116 to latch incoming commands.

A controller (e.g., the control logic 116 internal to the memory device 100) controls access to the array of memory cells 104 in response to the commands and might generate status information for the external processor 130, i.e., control logic 116 is configured to perform access operations (e.g., sensing operations [which might include read operations and verify operations], programming operations and/or erase operations) on the array of memory cells 104. The control logic 116 is in communication with row decode circuitry 108 and column decode circuitry 110 to control the row decode circuitry 108 and column decode circuitry 110 in response to the addresses. The control logic 116 might include instruction registers 126 which might represent computer-usable memory for storing computer-readable instructions. For some embodiments, the instruction registers 126 might represent firmware. Alternatively, the instruction registers 126 might represent a grouping of memory cells, e.g., reserved block(s) of memory cells, of the array of memory cells 104.

Control logic 116 might also be in communication with a cache register 118. Cache register 118 latches data, either incoming or outgoing, as directed by control logic 116 to temporarily store data while the array of memory cells 104 is busy writing or reading, respectively, other data. During a programming operation (e.g., write operation), data might be passed from the cache register 118 to the data register 120 for transfer to the array of memory cells 104; then new data might be latched in the cache register 118 from the I/O control circuitry 112. During a read operation, data might be passed from the cache register 118 to the I/O control circuitry 112 for output to the external processor 130; then new data might be passed from the data register 120 to the cache register 118. The cache register 118 and/or the data register 120 might form (e.g., might form a portion of) a page buffer of the memory device 100. A page buffer might further include sensing devices (not shown in FIG. 1) to sense a data state of a memory cell of the array of memory cells 104, e.g., by sensing a state of a data line connected to that memory cell. A status register 122 might be in communication with I/O control circuitry 112 and control logic 116 to latch the status information for output to the processor 130.

Memory device 100 receives control signals at control logic 116 from processor 130 over a control link 132. The control signals might include a chip enable CE#, a command latch enable CLE, an address latch enable ALE, a write enable WE#, a read enable RE#, and a write protect WP#. Additional or alternative control signals (not shown) might be further received over control link 132 depending upon the nature of the memory device 100. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands might be received over input/output (I/O) pins [7:0] of I/O bus 134 at I/O control circuitry 112 and might then be written into command register 124. The addresses might be received over input/output (I/O) pins [7:0] of I/O bus 134 at I/O control circuitry 112 and might then be written into address register 114. The data might be received over input/output (I/O) pins [7:0] for an 8-bit device or input/output (I/O) pins [15:0] for a 16-bit device at I/O control circuitry 112 and then might be written into cache register 118. The data might be subsequently written into data register 120 for programming the array of memory cells 104. For another embodiment, cache register 118 might be omitted, and the data might be written directly into data register 120. Data might also be output over input/output (I/O) pins [7:0] for an 8-bit device or input/output (I/O) pins [15:0] for a 16-bit device. Although reference might be made to I/O pins, they might include any conductive nodes providing for electrical connection to the memory device 100 by an external device (e.g., processor 130), such as conductive pads or conductive bumps as are commonly used.

It will be appreciated by those skilled in the art that additional circuitry and signals can be provided, and that the memory device 100 of FIG. 1 has been simplified. It should be recognized that the functionality of the various block components described with reference to FIG. 1 might not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Additionally, while specific I/O pins are described in accordance with popular conventions for receipt and output of the various signals, it is noted that other combinations or numbers of I/O pins (or other I/O node structures) might be used in the various embodiments.

Figure 2:
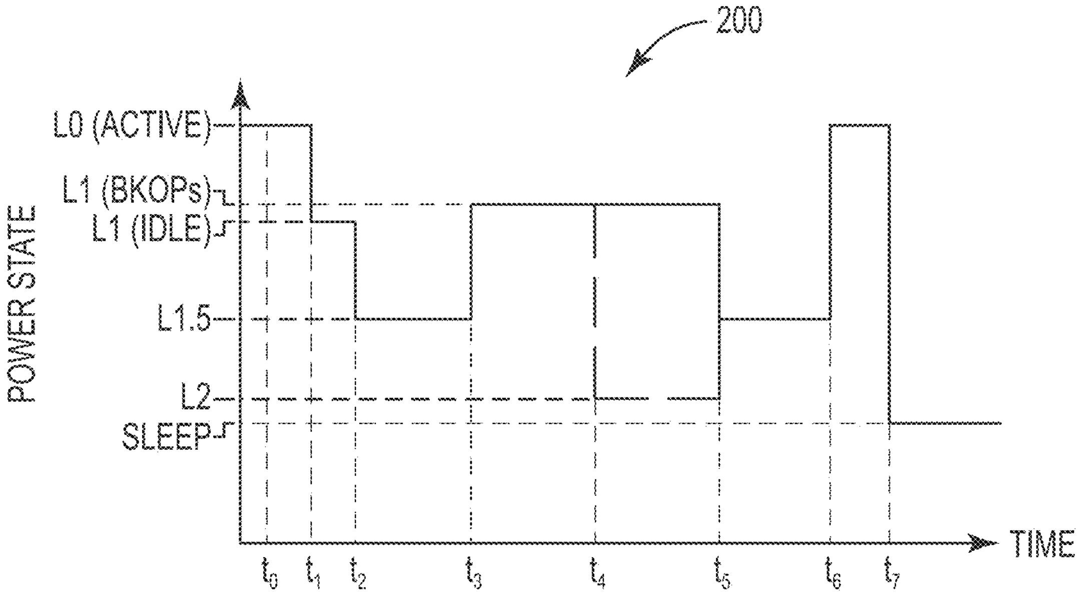
FIG. 2 is a timing diagram depicting idle time power management, according to an embodiment.

FIG. 2 is a chart 200 depicting idle time power management, according to an embodiment. Chart 200 includes power state versus time in response to various commands during an idle time. Prior to time $t_0$, the memory device is in a L0 (active) power state, which is the highest power state. In response to a no commands from the host in the queue (e.g., queue empty) at time $t_1$, the memory device enters an idle time and transitions to the L1 (idle) power state, which is lower than the L0 (active) power state. After a predetermined period defined by an autohibernate value (e.g., 10 ms) has elapsed between time $t_1$ and time $t_2$, at time $t_2$, in response to receiving an enter hibernate command from the host, the memory device transitions to the L1.5 power state, which is lower than the L1 (idle) power state. At time $t_3$, in response to an internal command to perform background operations, the memory device transitions to the L1 (BKOPs) power state, which is higher than the L1 (idle) power state and less than the L0 (active) power state, and begins background operations. At time $t_4$, if the background operations are complete, the memory device may transition to the L2 power state, which is lower than the L1.5 power state. At time $t_5$, the memory device may transition back to the L1.5 power state. At time $t_6$, in response to a command from the host to exit the idle time and return to the active state, the memory device may transition back to the L0 (active) power state. At time $t_7$, after an autosuspend delay (e.g., 3 s), the memory device receives the sleep command from the host and in response to the sleep command, the memory device may transition to the sleep power state, which is the lowest power state.

As indicated in Table 1 below, the higher the power state, the higher the power consumption. Further, in general the higher the power state, the lower the response latency (except when background operations are being performed, which results in the longest response latencies when a host command collides with the background operations). Accordingly, by optimizing the power state transition during idle times, the power/latency tradeoff may be improved.

TABLE 1

Example Power States-Currents and Latencies

| Power States | Average Current | Latency Read (μs) | Latency Write (μs) |
|---|---|---|---|
| L0 (Active) | 405 | N/A | N/A |
| L1 (BKOPs) | 270 | 700~1300 | 1400~8000 |
| L1 (Idle) | 200 | 250 | 330~450 |
| L1.5 | 15 | 205~320 | 300~450 |
| L2 | 0.25 | 380~500 | 1400 |

Figure 3:
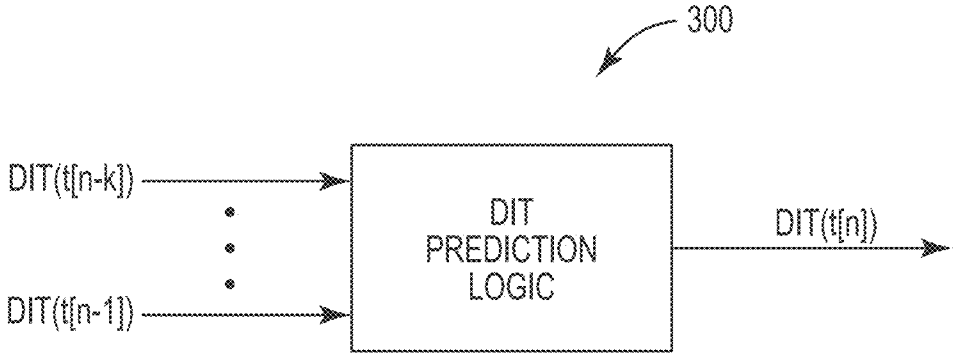
FIG. 3 is a simplified block diagram of prediction logic to predict an idle time based on previous idle times, according to an embodiment.

FIG. 3 is a simplified block diagram of discretized idle time (DIT) prediction logic 300 to predict an idle time based on previous idle times, according to an embodiment. DIT prediction logic 300 may be implemented by processor 130 of FIG. 1. Previous idle times may be characterized as either short (e.g., less than a threshold) or long (e.g., greater than a threshold). An upcoming idle time may be predicted to be short (e.g., less than a threshold) or long (e.g., greater than a threshold), or in some examples, indeterminate (e.g., within a predetermined range around a threshold). A previous short idle time may be discretized as a first value (e.g., 0) and a previous long idle time may be discretized as a second value (e.g., 1). Prediction logic 300 receives a plurality of previously discretized idle times indicated by DIT(t[n−k]) to DIT(t[n−1]) where "n" indicates the upcoming idle time and "k" is a lookback value including any suitable number of previous idle times (e.g., 3, 4, 5, 6, or more). Based on the plurality of previous discretized idle times, prediction logic 300 outputs an idle time prediction indicated by DIT(t[n]) for the upcoming idle time. The upcoming idle time prediction may have a first value (e.g., 0) indicating a short idle time, a second value (e.g., 1) indicating a long idle time, or in some examples, a third value (e.g., −1) indicating an indeterminate idle time.

As shown in the Example Tables below, the idle times may be discretized into intervals (e.g., bins) separated by a threshold. For example, for a threshold equal to 100 ms, idle times less than 100 ms may be a discretized as a first value (e.g., bin 0) and idle times greater than 100 ms may be discretized as a second value (e.g., bin 1). The lookback value "k" sets the length of the input vector, such that a feature vector equals {bin(t[n−1], . . . , bin(t[n−k]} as shown below in the Histogram Counter Table for a lookback value of 3. The idle time is predicted at time t[n]. During training, for each possibility of the lookback input vector, the probability of every possible value for DIT(t[n]) may be computed as shown below in the Translation Table. In other examples, the Translation Table may be excluded. The data may then be converted into a DIT Decision Look-Up Table (LUT) as shown below, either from the Translation Table or directly from the Histogram Counter Table. In operation, for a given lookback input vector, e.g., row of the DIT Decision LUT, the predicted DIT(t[n]) value is outputted. For example, for an input vector corresponding to row 2, the predicted idle time is output as 0 indicating a short idle time, for an input vector corresponding to row 3, the predicted idle time is output as 1 indicating a long idle time, and for an input vector corresponding to row 4, the predicted idle time is output as −1 indicating an indeterminate idle time.

Example Tables: DIT Prediction Logic

Histogram Counter Table

Idle times discretized into two bins (i.e., bin 0 [second column] or bin 1 [third column])
Lookback = 3 for $2^3$ = 8 possible DIT vectors (indicated by the first column)

```
[ [ 0 8805 1568 ]
  [ 1 1539 997 ]
  [ 2 1253 993 ]
  [ 3 1299 2226 ]
  [ 4 1249 1297 ]
  [ 5 983 2243 ]
  [ 6 1361 2184 ]
  [ 7 2243 6227 ] ]
```

Translation Table

For Converting Histogram Counter Table to DIT Decision LUT
Ratio representation of the Histogram Counter Table used to compare the bin 0 and bin 1 quantities

```
[ [ 0. 24.15 4.3 ]
  [ 1. 4.22 2.73 ]
  [ 2. 3.44 2.72 ]
  [ 3. 3.56 6.1 ]
  [ 4. 3.43 3.56 ]
  [ 5. 2.7 6.15 ]
  [ 6. 3.73 5.99 ]
  [ 7. 6.15 17.08 ] ]
```

-continued

| Translation Table |
| --- |
| DIT Decision LUT<br>[ [ 0. 0 ]<br>[ 1. 0 ]<br>[ 2. 0 ]<br>[ 3. 1 ]<br>[ 4. −1 ]<br>[ 5. 1 ]<br>[ 6. −1 ]<br>[ 7. 1 ] ] |

Figure 4A:
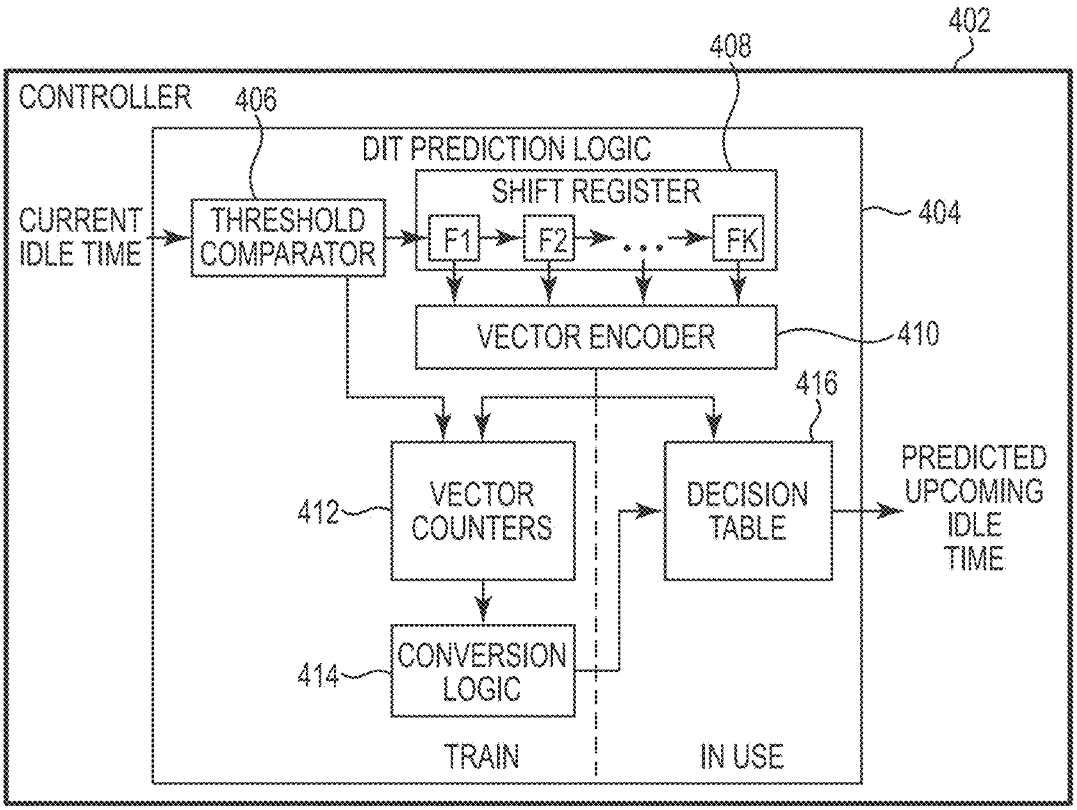
FIGS. 4A and 4B are block diagrams of prediction logic to predict an idle time based on previous idle times, according to another embodiment. various idle time predictions in accordance with various embodiments.
Figure 4B:
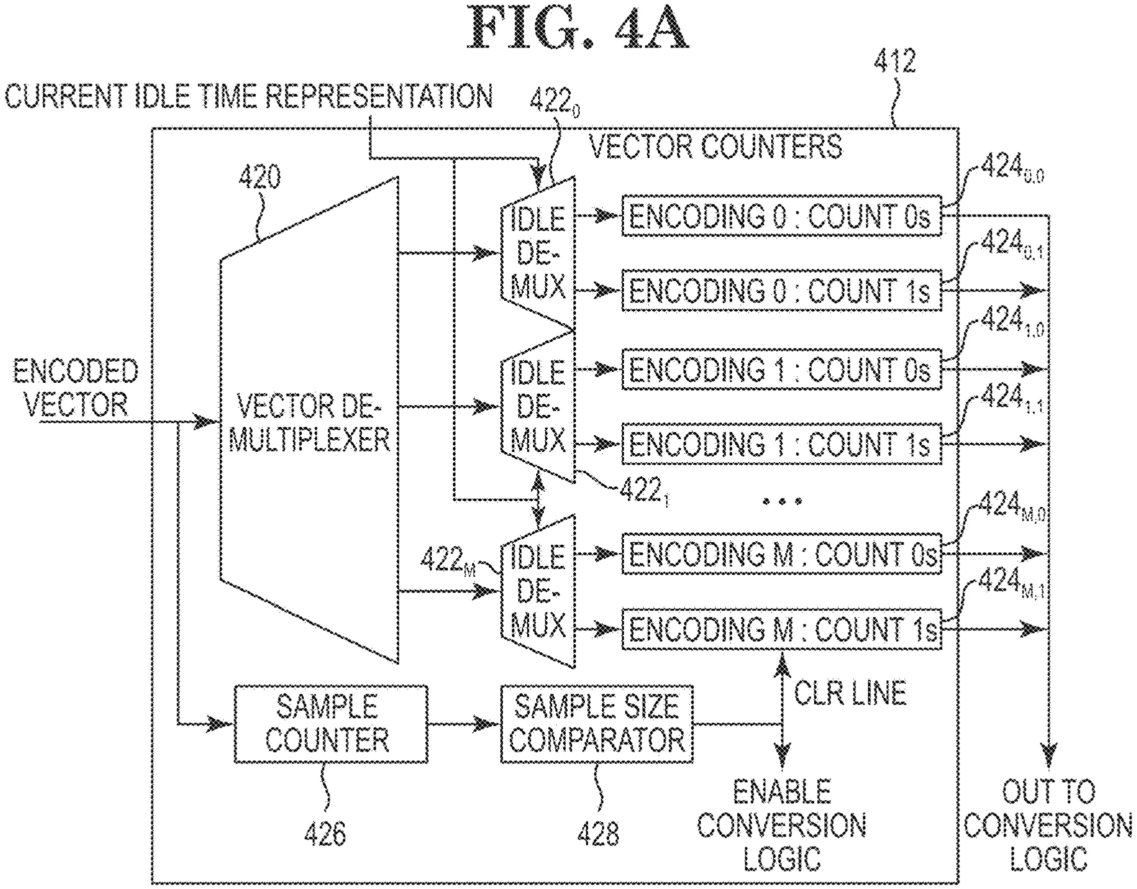

FIGS. 4A and 4B are block diagrams of DIT prediction logic 404 implemented by a controller 402, according to an embodiment. In some examples, controller 402 might be a part of processor 130 of FIG. 1. DIT prediction logic 404 includes a threshold comparator 406, a shift register 408, a vector encoder 410, a plurality of vector counters 412, conversion logic 414, and a decision table 416. The input of threshold comparator 406 might receive the current idle time. A first output of threshold comparator 406 might be connected to the input of shift register 408 and a second output of threshold comparator 406 might be connected to a first input of vector counters 412. The outputs of shift register 408 might be connected to the inputs of vector encoder 410. The output of vector encoder 410 might be connected to a second input of vector counters 412 and a first input of decision table 416. The output of vector counters 412 might be connected to the input of conversion logic 414. The output of conversion logic 414 might be connected to a second input of decision table 416. The output of decision table 416 might output the predicted upcoming idle time.

The threshold comparator 406 might receive the current idle time to generate a current idle time representation indicating whether the current idle time is less than (or less than or equal to) a threshold time or greater than (or greater than or equal to) the threshold time. That is, the threshold comparator might discretize the current idle time based on the threshold time to generate a binary representation of the current idle time. For example, if the current idle time is less than the threshold (or less than or equal to the threshold), the threshold comparator 406 may output a 0 to the shift register 408 indicating a short idle time. If the current idle time is greater than the threshold (or greater than or equal to the threshold), the threshold comparator 406 may output a 1 to the shift register 408 indicating a long idle time.

The shift register 408 might store a predetermined number of previous idle time representations received from the threshold comparator 406. For example, F1 might store DIT(t[n−1]), F2 might store DIT(t[n−2]), . . . , and FK might store DIT(t[n−k]). The vector encoder 410 might generate an encoded vector representing a current sequence of the predetermined number of previous idle time representations stored in the shift register 408. That is, vector encoder 410 might encode a vector of binary representations of the predetermined number of previous idle times. The encoded vector from vector encoder 410 might be output to vector counters 412 and decision table 416.

Each vector counter of the plurality of vector counters 412 might correspond to a different potential sequence of the predetermined number of previous idle time representations. A vector counter of the plurality of vector counters 412 corresponding to the encoded vector from vector encoder 410 might be incremented based on the current idle time representation from threshold comparator 406. That is, a corresponding vector counter of the plurality of vector counters 412 might be incremented based on the binary representation of the current idle time and the encoded vector. The example Histogram Counter Table described above is one example of data that could be stored within the vector counters 412.

Conversion logic 414 might generate the decision table 416 indicating the prediction for the subsequent idle time for each potential sequence of the predetermined number of previous idle time representations. Thus, decision table 416 may be used to output a prediction for a subsequent idle time based on the encoded vector and the vector counter corresponding to the encoded vector. That is, decision table 416 might be generated by conversion logic 414 based on the plurality of vector counters 412, and decision table 416 might be used to predict whether a subsequent idle time will be less than the threshold time, greater than the threshold time, or indeterminate based on the decision table and the encoded vector. The example DIT Decision LUT described above is one example of data that could be stored within the decision table 416.

As illustrated in FIG. 4B, the vector counters 412 might include a vector demultiplexer 420, idle time demultiplexers 422$_0$ to 422$_M$, counter pairs 424$_{0.0}$, 424$_{0.1}$ to 424$_{M.0}$, 424$_{M.1}$, a sample counter 426, and a sample size comparator 428, where "M" is the number of counter pairs (e.g., for look-back=3, M=7 for 8 possible encoded vectors and corresponding counter pairs). The input of vector demultiplexer 420 might receive the encoded vector from vector encoder 410. The outputs of vector demultiplexer 420 might be connected to the corresponding inputs of idle time demultiplexers 422$_0$ to 422$_M$. The control inputs of idle time demultiplexers 422$_0$ to 422$_M$ might receive the current idle time representation from the threshold comparator 406. The outputs of each idle time demultiplexer 422$_0$ to 422$_M$ might be connected to corresponding inputs of counter pairs 424$_{0.0}$, 424$_{0.1}$ to 424$_{M.0}$, 424$_{M.1}$. The outputs of the counter pairs 424$_{0.0}$, 424$_{0.1}$ to 424$_{M.0}$, 424$_{M.1}$ might be connected to the input of the conversion logic 414. The input of sample counter 426 might receive the encoded vector from vector encoder 410. The output of sample counter 426 might be connected to the input of sample size comparator 428. The output of sample size comparator 428 might be connected to a clear input of each counter 424$_{0.0}$, 424$_{0.1}$ to 424$_{M.0}$, 424$_{M.1}$ and to an enable input of the conversion logic 414.

Vector demultiplexer 420 might select the corresponding idle time demultiplexer 422$_0$ to 422$_M$ based on the encoded vector. The selected idle time demultiplexer 422$_0$ to 422$_M$ might increment the respective counter 424$_{0.0}$, 424$_{0.1}$ to 424$_{M.0}$, 424$_{M.1}$ based on the current idle time representation. For example, if the encoded vector corresponds to idle time demultiplexer 422$_0$ and the current idle time representation equals 0, counter 424$_{0.0}$ is incremented. If the encoded vector corresponds to idle time demultiplexer 422$_0$ and the current idle representation equals 1, counter 424$_{0.1}$ is incremented. Accordingly, a counter 424$_{0.0}$, 424$_{0.1}$ to 424$_{M.0}$, 424$_{M.1}$ corresponding to the encoded vector and the binary representation of the current idle time might be incremented for each idle time of the memory device.

Figure 5A:
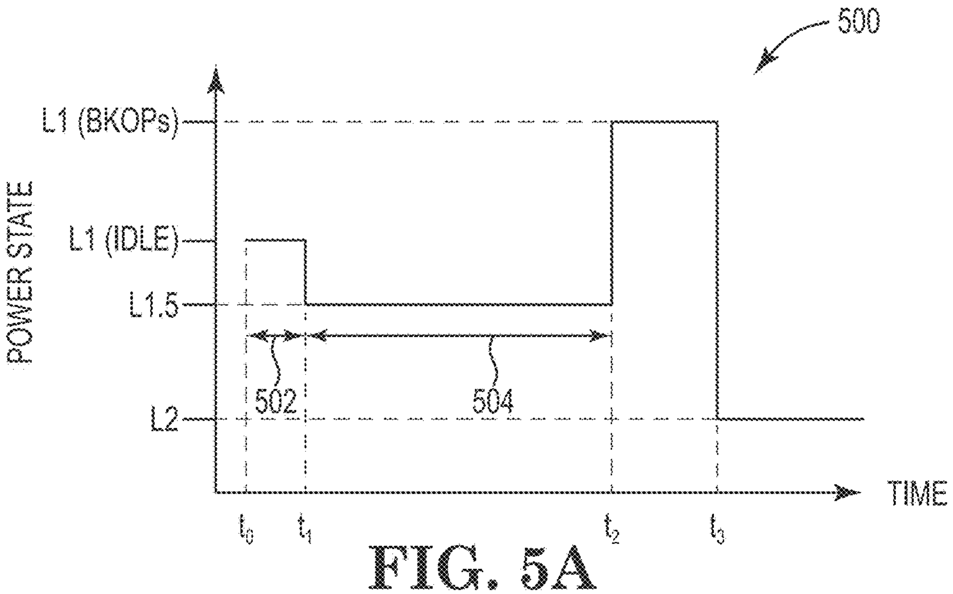

The sample counter 426 might count the number of idle times that have been processed, such as by incrementing a counter each time the encoded vector 410 is updated. The sample size comparator 428 might enable the conversion logic 414 in response to the count of the sample counter being greater than or equal to a count threshold. In some examples, the count threshold may be equal to 10, 100, 1000, or more. The sample size comparator 428 might reset the plurality of counters 424$_{0.0}$, 424$_{0.1}$ to 424$_{M.0}$, 424$_{M.1}$ after enabling the conversion logic 414. Thus, the decision table 416 might be updated each time the count of idle times reaches the count threshold. The time when counters $\mathbf{424}_{0.0}$, $\mathbf{424}_{0.1}$ to $\mathbf{424}_{M.0}$, $\mathbf{424}_{M.1}$ are incremented to accumulate data for generating decision table 416 may be referred to as a training period. various idle time predictions in accordance with various embodiments. FIG. 5A is a timing diagram 500 depicting idle time power management in response to predicting the length of the subsequent idle time will be less than a first threshold time (e.g., the subsequent idle time will be a short idle time). At time to, the memory device enters an idle time in response to no commands from the host in the queue (e.g., queue empty). After a predetermined period defined by an autohibernate value (e.g., about 10 ms) as indicated at 502, at time $t_1$ the memory device transitions to the L1.5 power state (e.g., a first power state) in response to receiving a first (e.g., enter hibernate) command from the host. At time $t_2$, after the first threshold time has elapsed as indicated at 504, the memory device transitions to the L1 (BKOPs) power state (e.g., a second power state) higher than the L1.5 power state if there are backgrounds operations to be processed. If there are no background operations to be processed, the memory device may transition to the L2 power state at time $t_2$. Between time $t_2$ and time $t_3$, the memory device runs background operations in the L1 (BKOPs) power state. At time $t_3$, in response to completing the background operations, the memory device transitions to a L2 power state (e.g., a third power state) lower than the L1.5 power state. Thus, the idle time power management depicted by timing diagram 500 of FIG. 5A balances reduced response latency with reduced power consumption when the idle time is predicted to be short.

Figure 5B:
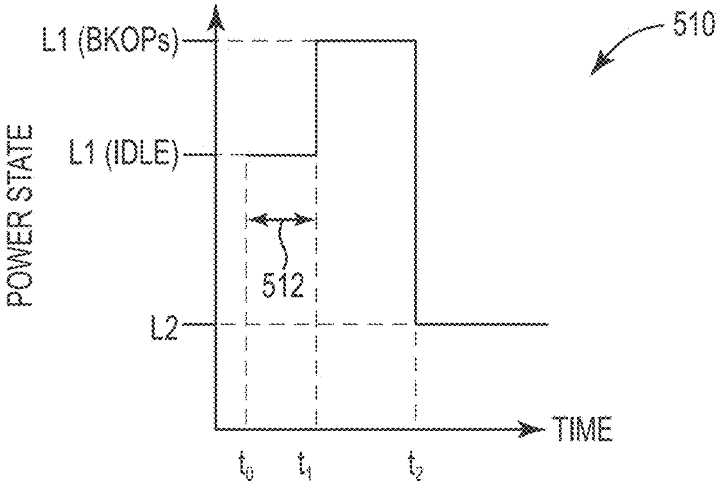

FIG. 5B is a timing diagram 510 depicting idle time power management in response to predicting the length of the subsequent idle time will be greater than the first threshold time (e.g., the subsequent idle time will be a long idle time). At time to, the memory device enters an idle time in response to no commands from the host in the queue (e.g., queue empty). After a predetermined period defined by an autohibernate value (e.g., about 10 ms) as indicated at 512, at time $t_1$ the memory device transitions to the L1 (BKOPs) power state (e.g., the second power state) if there are background operations to be processed in response to receiving a first (e.g., enter hibernate) command from the host. If there are no background operations to be processed, the memory device may transition to the L2 power state at time $t_1$. Between time $t_1$ and time $t_2$, the memory device runs background operations in the L1 (BKOPs) power state. At time $t_2$, in response to completing the background operations, the memory device transitions to the L2 power state (e.g., the third power state). Accordingly, compared to the idle time power management depicted by FIG. 5A, the L2 power state is reached sooner in the idle time power management depicted by FIG. 5B, thereby reducing power consumption. Thus, the idle time power management depicted by timing diagram 510 of FIG. 5B prioritizes reduced power consumption over reduced response latency when the idle time is predicted to be long.

Figure 5C:
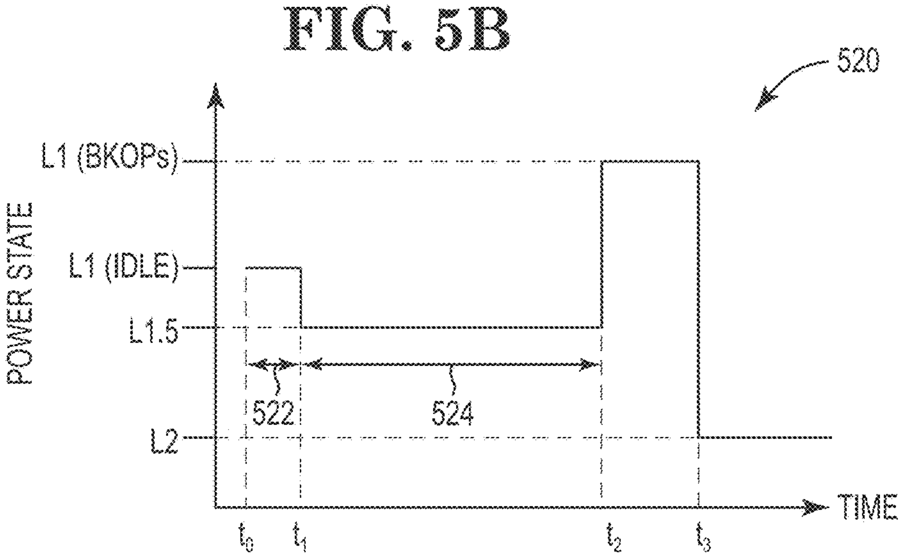

FIG. 5C is a timing diagram 520 depicting idle time power management in response to predicting the length of the subsequent idle time will be indeterminate (e.g., the subsequent idle time cannot be predicted to be short or long within a desired accuracy threshold). At time to, the memory device enters an idle time in response to no commands from the host in the queue (e.g., queue empty). After a predetermined period defined by an autohibernate value (e.g., about 10 ms) as indicated at 522, at time $t_1$ the memory device transitions to the L1.5 power state (e.g., the first power state) in response to receiving a first (e.g., enter hibernate) command from the host. At time $t_2$, after a second threshold time has elapsed as indicated at 524, the memory device transitions to the L1 (BKOPs) power state (e.g., the second power state) higher than the L1.5 power state if there are background operations to be processed. If there are no background operations to be processed, the memory device may transition to the L2 power state at time $t_2$. In some examples, the second threshold time indicated at 524 in FIG. 5C may be different from the first threshold time indicated at 504 in FIG. 5A. In other examples, the second threshold time indicated at 524 in FIG. 5C may be equal to the first threshold time indicated at 504 in FIG. 5A. In other examples, the second threshold time indicated at 524 in FIG. 5C may be less than the first threshold time indicated at 504 in FIG. 5A. Between time $t_2$ and time $t_3$, the memory device runs background operations in the L1 (BKOPs) power state. At time $t_3$, in response to completing the background operations, the memory device transitions to the L2 power state (e.g., the third power state) lower than the L1.5 power state. Thus, compared to the idle time power management depicted by timing diagram 510 of FIG. 5B, the idle time power management depicted by timing diagram 520 of FIG. 5C balances reduced response latency with reduced power consumption when the idle time is predicted to be indeterminate.

FIGS. 6A-6I are flowcharts of a method 600 for predicting idle times in accordance with an embodiment. Method 600 may correspond at least in part to FIGS. 1-5C. For example, FIGS. 6A-6I might represent a method for predicting idle times for memory device 100 of FIG. 1. The method might be in the form of computer-readable instructions, e.g., stored to a memory of processor 130 of FIG. 1. Such computer-readable instructions might be executed by a controller, e.g., the processor 130, to cause the memory device 100 to perform the method.

Method 600 might be implemented within a memory device (e.g., 100) including an interface (e.g., 132/134) to communicate with a host (e.g., 130), an array of memory cells (e.g., 104), and a controller (e.g., 130) configured to access the array of memory cells in response to commands from the host as previously described at least with reference to FIG. 1.

Figure 6A:
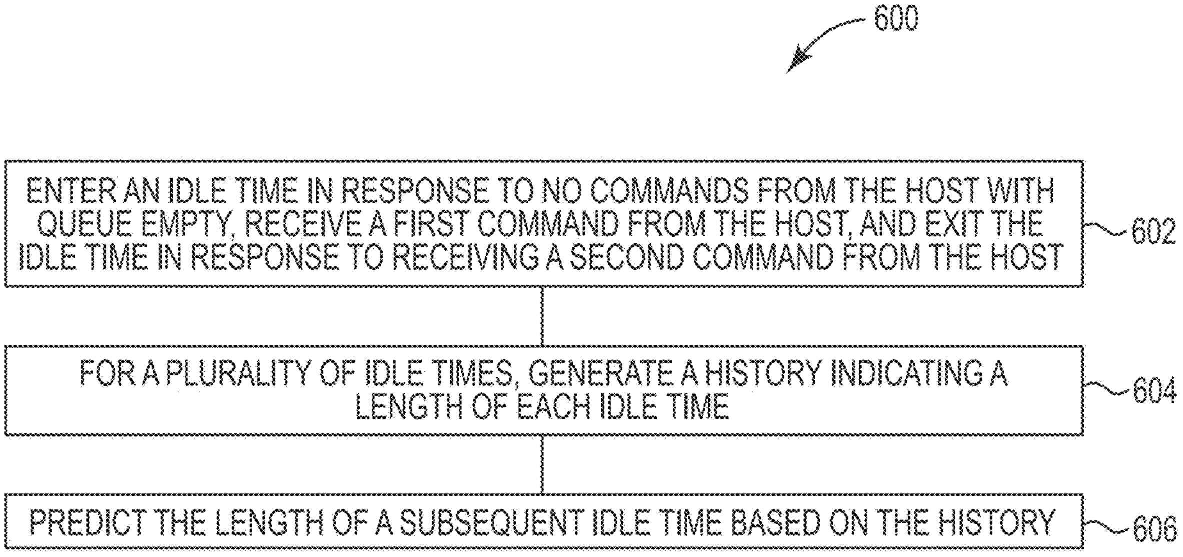
FIGS. 6A-6I are flowcharts of a method for predicting idle times in accordance with an embodiment.

As illustrated in FIG. 6A at 602, the controller may enter an idle time in response to no commands from the host with queue empty (e.g., as indicated at time to in FIGS. 5A-5C), receive a first command from the host, and exit the idle time in response to receiving a second command from the host (e.g., as indicated at time to in FIG. 2 to return to the active power state or as indicated at time $t_7$ in FIG. 2 to transition to the hibernate power state). At 604, the controller may, for a plurality of idle times, generate a history indicating a length of each idle time (e.g., via vector counters 412 of FIGS. 4A and 4B). At 606, the controller may predict the length of a subsequent idle time based on the history (e.g., via decision table 416 of FIG. 4A).

Figure 6B:
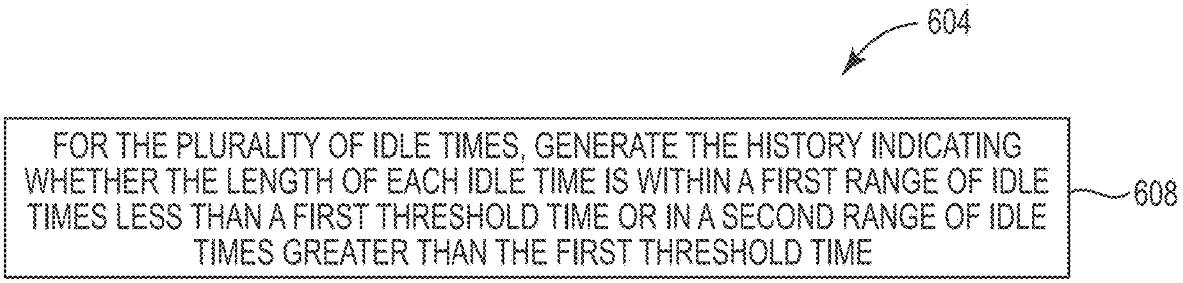
Figure 6C:
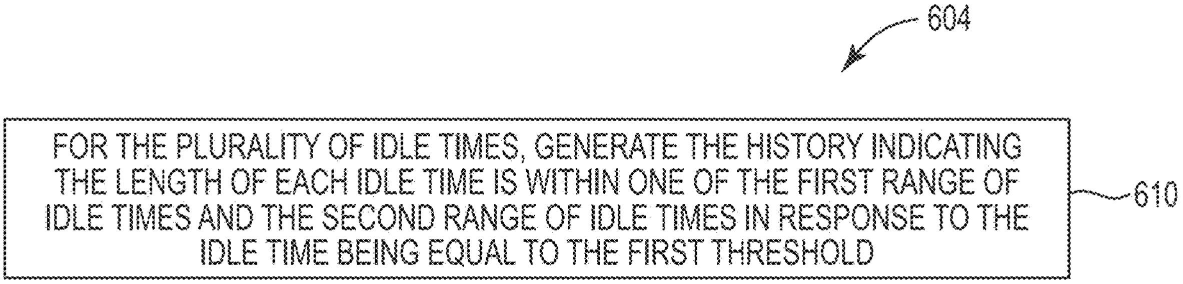
Figure 6D:
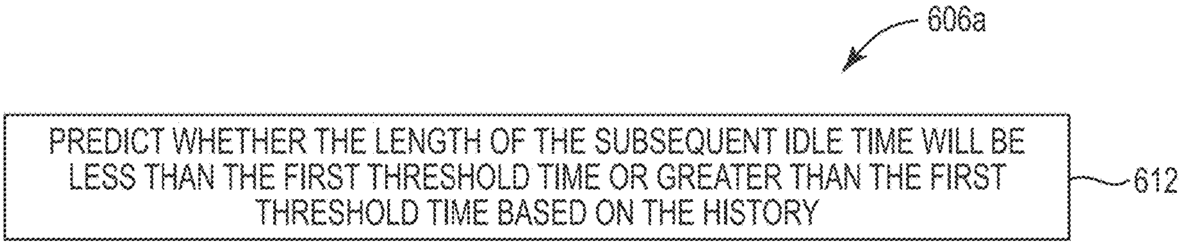
Figure 6E:
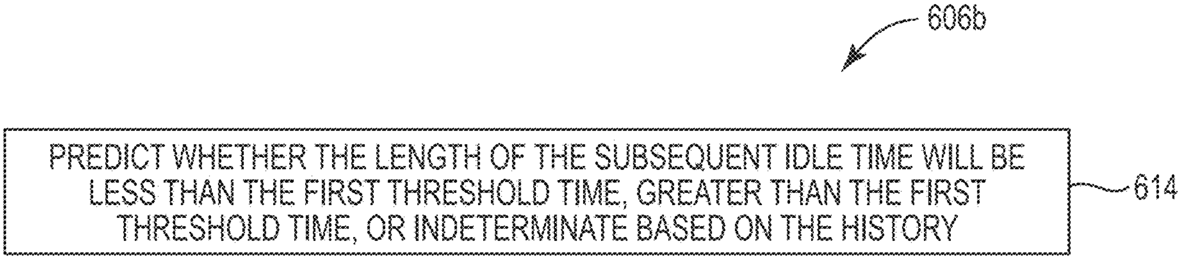

For the history generation at 604, as illustrated in FIG. 6B at 608, the controller may further, for the plurality of idle times, generate the history indicating whether the length of each idle time is within a first range of idle times less than a first threshold time or in a second range of idle times greater than the first threshold time (e.g., by incrementing a counter $\mathbf{424}_{0.0}$ to $\mathbf{424}_{M.0}$ or a counter $\mathbf{424}_{0.1}$ to $\mathbf{424}_{M.1}$ illustrated in FIG. 4B). In some examples for the history generation at 604, as illustrated in FIG. 6C at 610, the controller may further, for the plurality of idle times, generate the history indicating the length of each idle time is within one of the first range of idle times and the second range of idle times in response to the idle time being equal to the first threshold. In one example 606*a* of the prediction at 606, as illustrated in FIG. 6D at 612, the controller may further predict whether the length of the subsequent idle time will be less than the first threshold time or greater than the first threshold time based on the history. In another example 606*b* of the prediction at 606, as illustrated in FIG. 6E at 614, the controller may further predict whether the length of the subsequent idle time will be less than the first threshold time, greater than the first threshold time, or indeterminate based on the history.

Figure 6F:
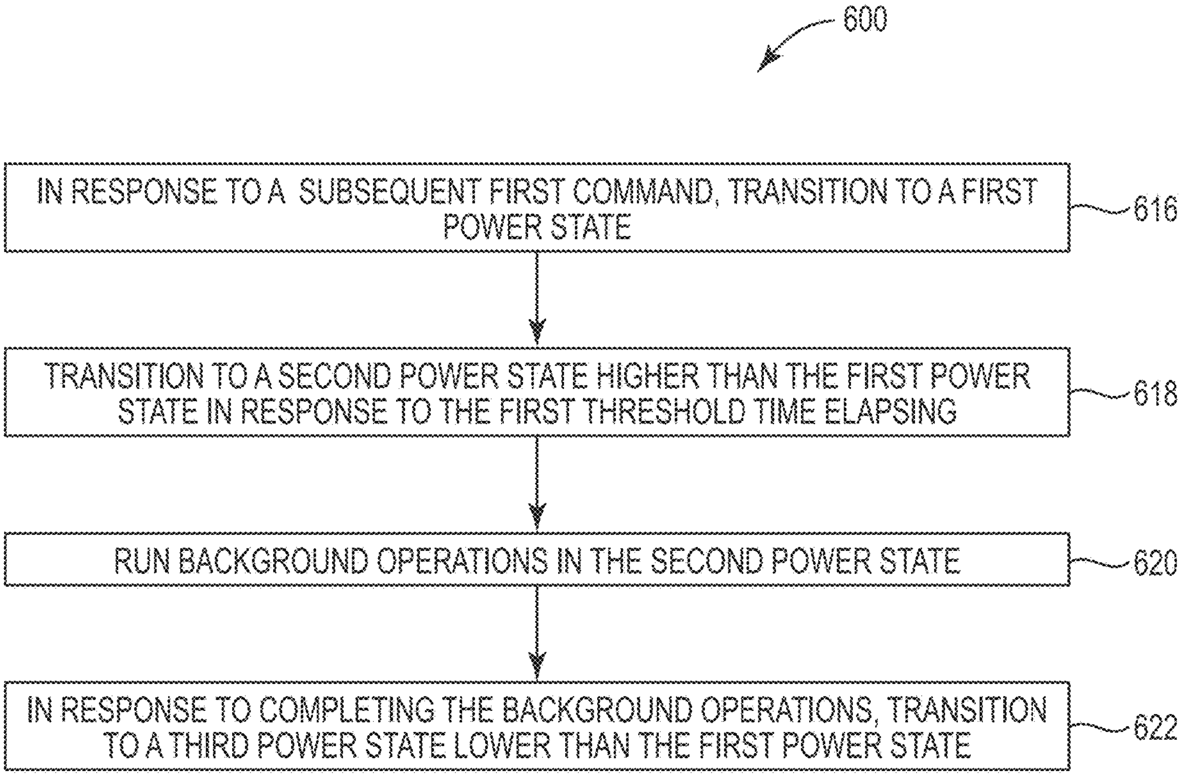
Figure 6G:
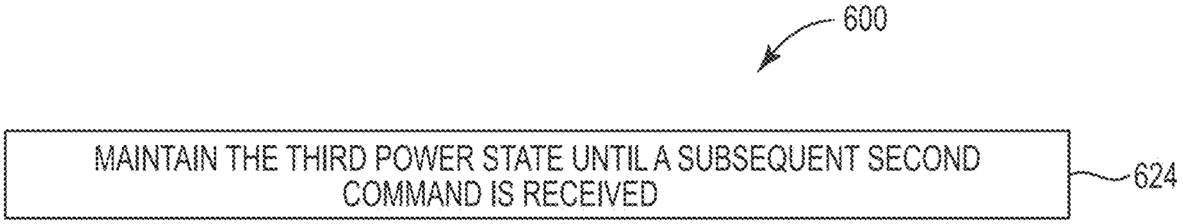

In response to predicting the length of the subsequent idle time will be less than the first threshold time, as illustrated in FIG. 6F at 616, the controller may further in response to a subsequent first command, transition to a first power state (e.g., transition to the L1.5 power state at time $t_1$ in FIG. 5A). At 618, the controller may further transition to a second power state higher than the first power state in response to the first threshold time elapsing (e.g., transition to the L1 (BKOPs) power state at time $t_2$ in response to the threshold time 504 elapsing in FIG. 5A). At 620, the controller may further run background operations in the second power state (e.g., between time $t_2$ and time $t_3$ of FIG. 5A). At 622, the controller may further in response to completing the background operations, transition to a third power state lower than the first power state (e.g., transition to the L2 power state at time $t_3$ in FIG. 5A). As illustrated in FIG. 6G at 624, the controller may further maintain the third power state until a subsequent second command is received (e.g., a subsequent command to return to the active power state or to transition to a hibernate or sleep state).

Figure 6H:
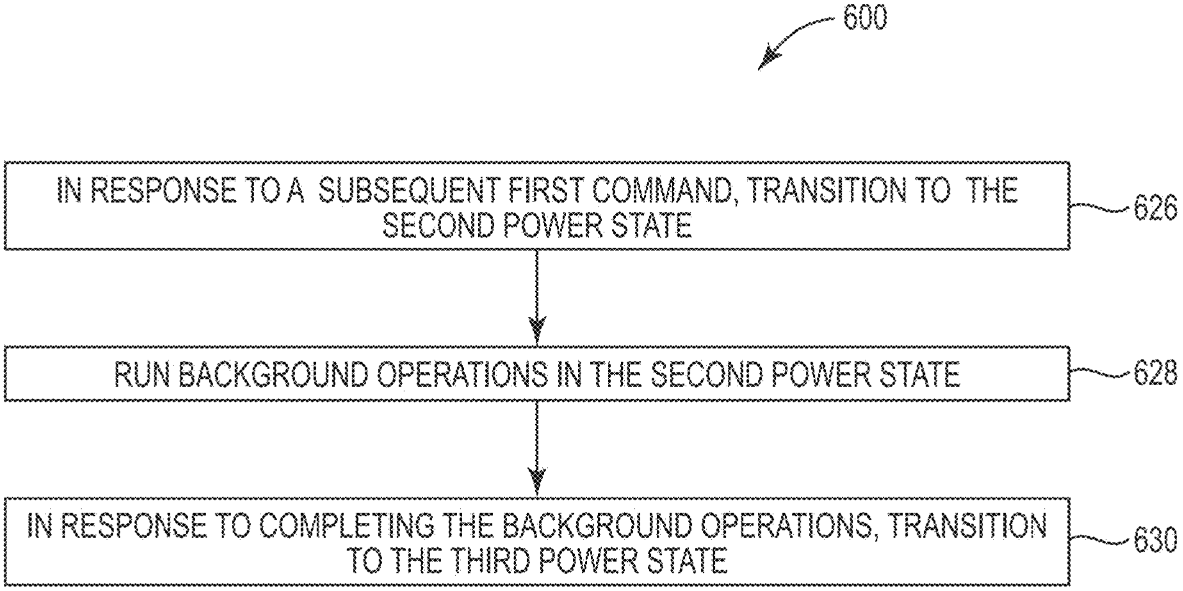

In response to predicting the length of the subsequent idle time will be greater than the first threshold time, as illustrated in FIG. 6H at 626, the controller may further in response to the subsequent first command, transition to the second power state (e.g., transition to the L1 (BKOPs) power state at time $t_1$ in FIG. 5B). At 628, the controller may further run background operations in the second power state (e.g., between time $t_1$ and time $t_2$ of FIG. 5B). At 630, the controller may further in response to completing the background operations, transition to the third power state (e.g., transition to the L2 power state at time $t_2$ in FIG. 5B).

Figure 6I:
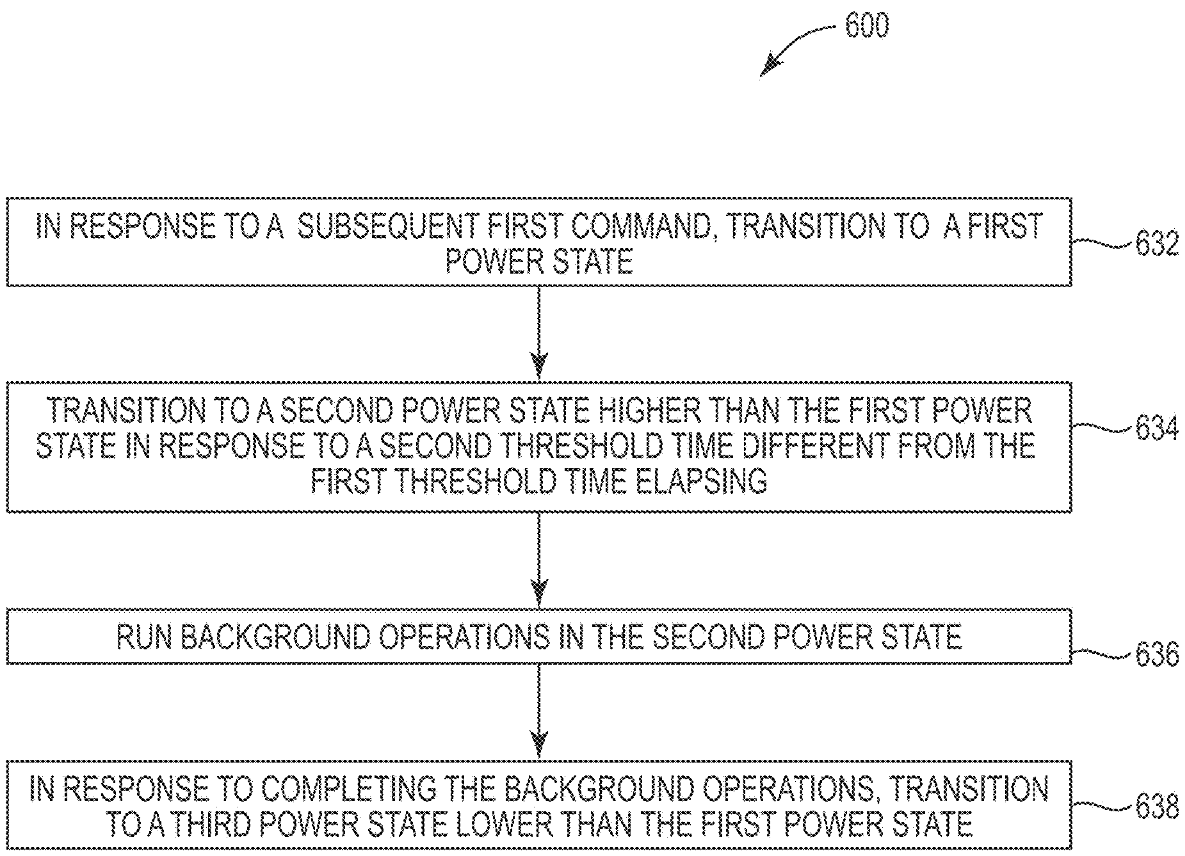

In response to predicting the length of the subsequent idle time will be indeterminate, as illustrated in FIG. 6I at 632, the controller may further in response to a subsequent first command, transition to a first power state (e.g., transition to the L1.5 power state at time $t_1$ in FIG. 5C). At 634, the controller may further transition to a second power state higher than the first power state in response to a second threshold time different from the first threshold time elapsing (e.g., transition to the L1 (BKOPs) power state at time $t_2$ in response to the threshold time 524 elapsing in FIG. 5C). At 636, the controller may further run background operations in the second power state (e.g., between time $t_2$ and time $t_3$ of FIG. 5C). At 638, the controller may further in response to completing the background operations, transition to a third power state lower than the first power state (e.g., transition to the L2 power state at time $t_3$ in FIG. 5C). In some examples, the second threshold time is less than the first threshold time.

FIGS. 7A-7F are flowcharts of a method 700 for predicting idle times in accordance with another embodiment. Method 700 may correspond at least in part to FIGS. 1-5C. For example, FIGS. 7A-7F might represent a method for predicting idle times for memory device 100 of FIG. 1. The method might be in the form of computer-readable instructions, e.g., stored to a memory of processor 130 of FIG. 1. Such computer-readable instructions might be executed by a controller, e.g., the processor 130, to cause the memory device 100 to perform the method.

Method 700 might be implemented within a flash storage device (e.g., 100) including an array of memory cells (e.g., 104) and a controller (e.g., 130) configured to access the array of memory cells as previously described at least with reference to FIG. 1. In some examples, the flash storage device includes a UFS device.

Figure 7A:
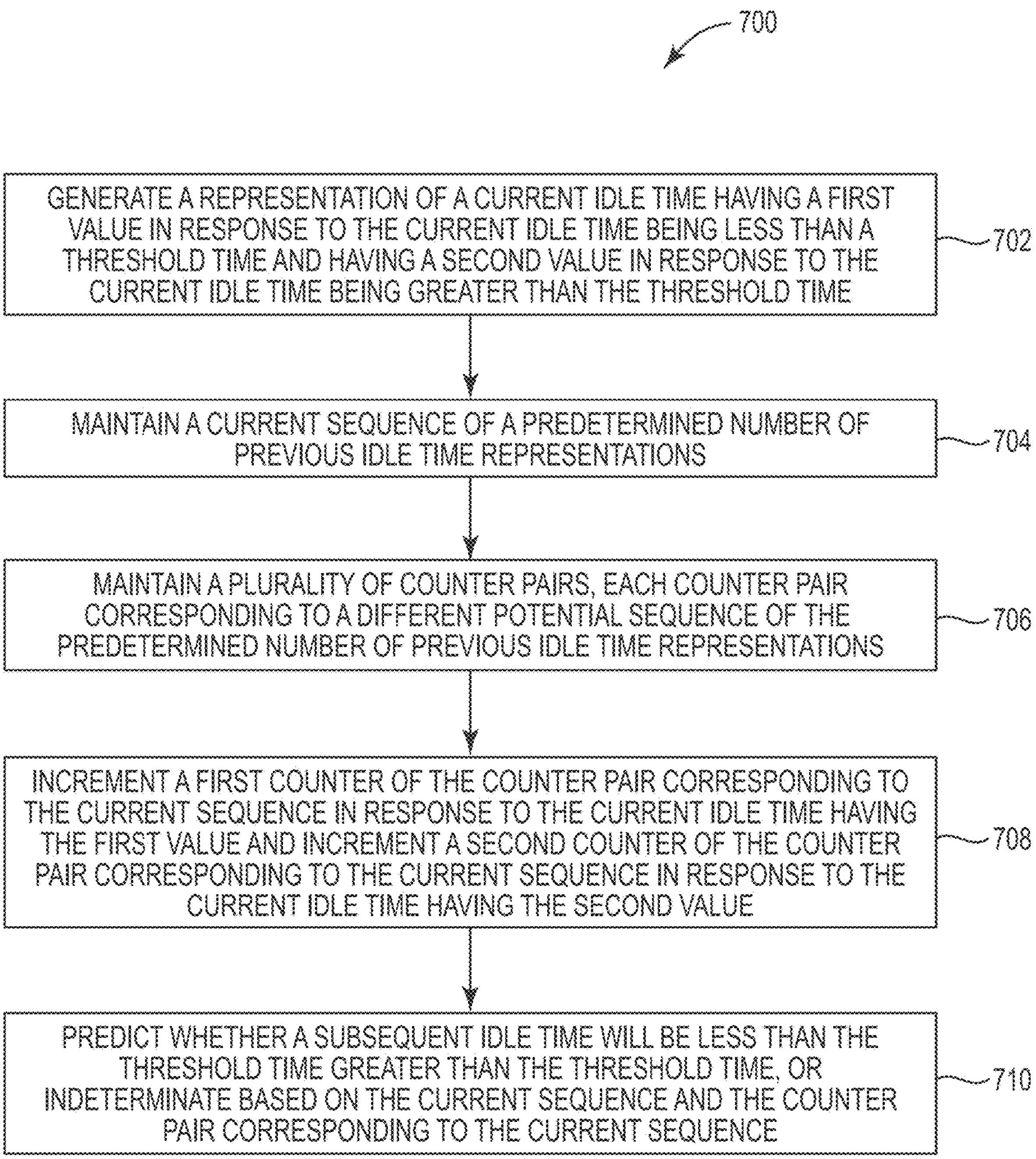
FIGS. 7A-7F are flowcharts of a method for predicting idle times in accordance with another embodiment.
Figure 7B:
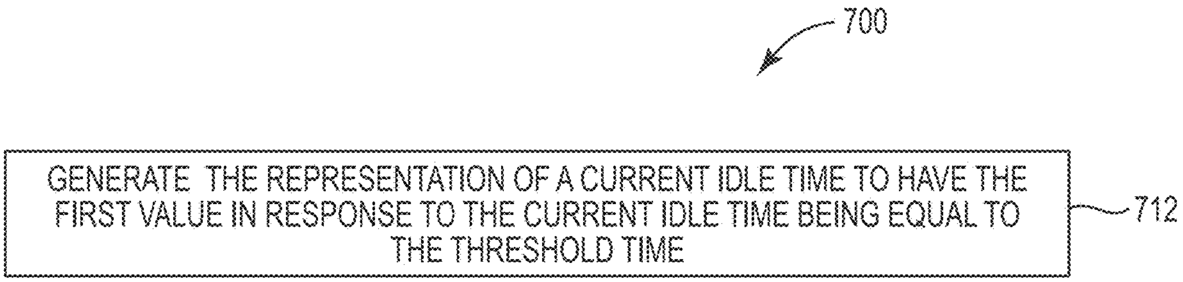

As illustrated in FIG. 7A at 702, the controller may generate a representation of a current idle time having a first value in response to the current idle time being less than a threshold time and having a second value in response to the current idle time being greater than the threshold time (e.g., via threshold comparator 406 of FIG. 4A). At 704, the controller may maintain a current sequence of a predetermined number of previous idle time representations (e.g., via shift register 408 and vector encoder 410 of FIG. 4A). At 706, the controller may maintain a plurality of counter pairs (e.g., counter pairs $\mathbf{424}_{0.0}$, $\mathbf{424}_{0.1}$ to $\mathbf{424}_{M.0}$, $\mathbf{424}_{M.1}$ of FIG. 4B), each counter pair corresponding to a different potential sequence of the predetermined number of previous idle time representations. At 708, the controller may increment a first counter of the counter pair corresponding to the current sequence in response to the current idle time having the first value and increment a second counter of the counter pair corresponding to the current sequence in response to the current idle time having the second value (e.g., via vector demultiplexer 420 and idle time demultiplexers $\mathbf{422}_0$ to $\mathbf{422}_M$). At 710, the controller may predict whether a subsequent idle time will be less than the threshold time, greater than the threshold time, or indeterminate based on the current sequence and the counter pair corresponding to the current sequence (e.g., via conversion logic 414 and decision table 416 of FIG. 4A). As illustrated in FIG. 7B at 712, the controller may further generate the representation of the current idle time to have the first value in response to the current idle time being equal to the threshold time.

Figure 7C:
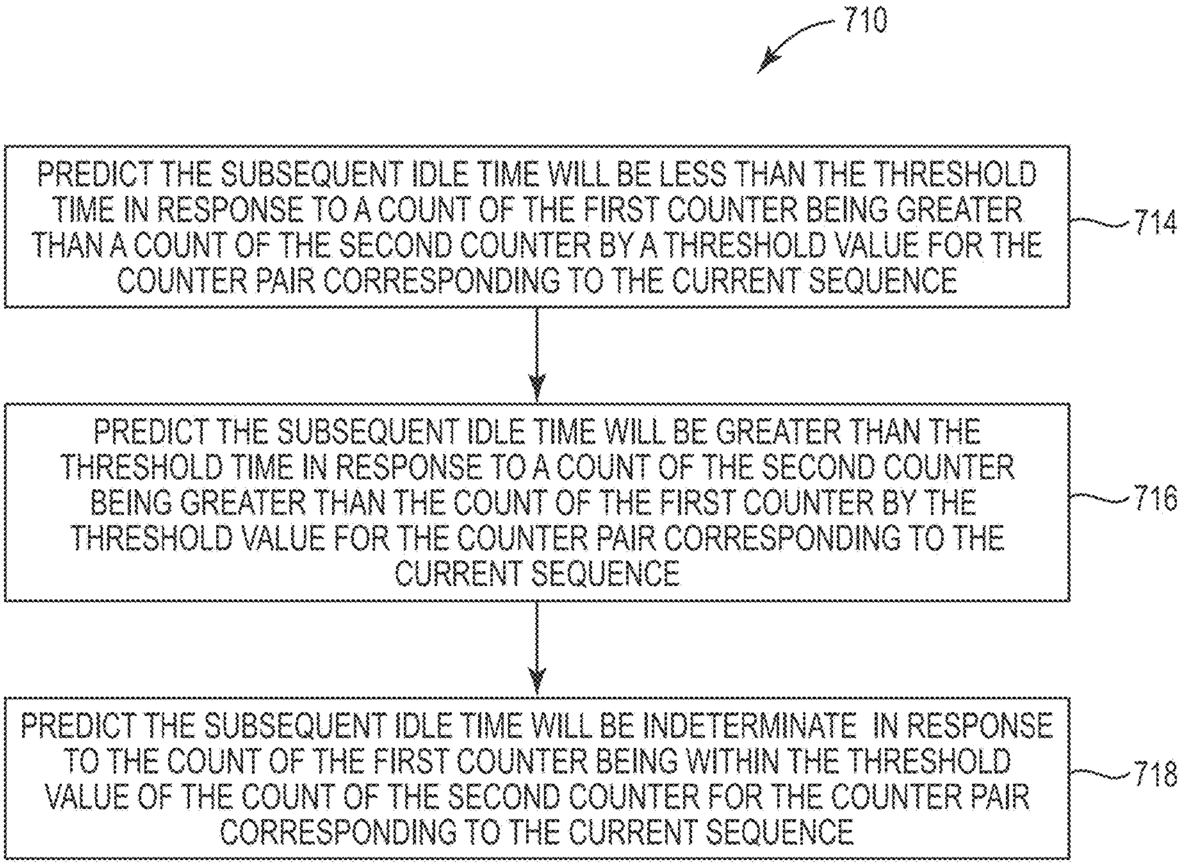

For the prediction at 710, as illustrated in FIG. 7C at 714, the controller may further predict the subsequent idle time will be less than the threshold time in response to a count of the first counter being greater than a count of the second counter by a threshold value for the counter pair corresponding to the current sequence. At 716, the controller may further predict the subsequent idle time will be greater than the threshold time in response to the count of the second counter being greater than the count of the first counter by the threshold value for the counter pair corresponding to the current sequence. At 718, the controller may further predict the subsequent idle time will be indeterminate in response to the count of the first counter being within the threshold value of the count of the second counter for the counter pair corresponding to the current sequence.

Figure 7D:
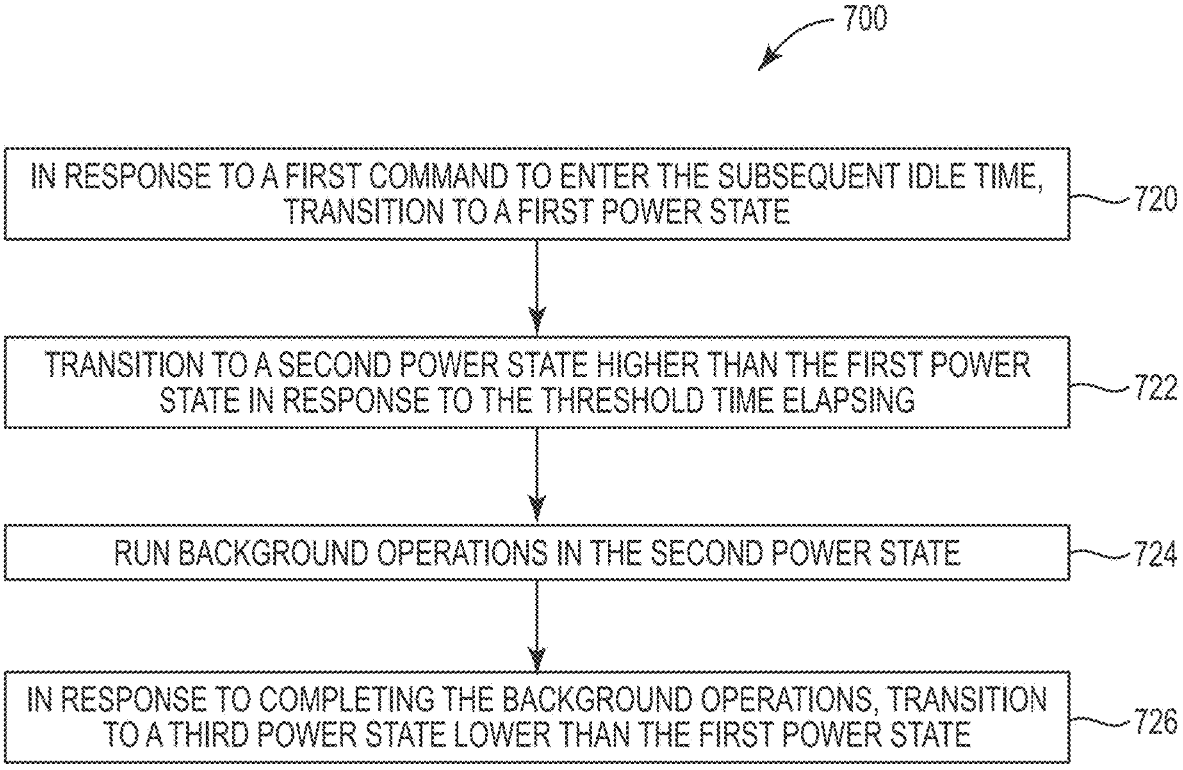
Figure 7E:
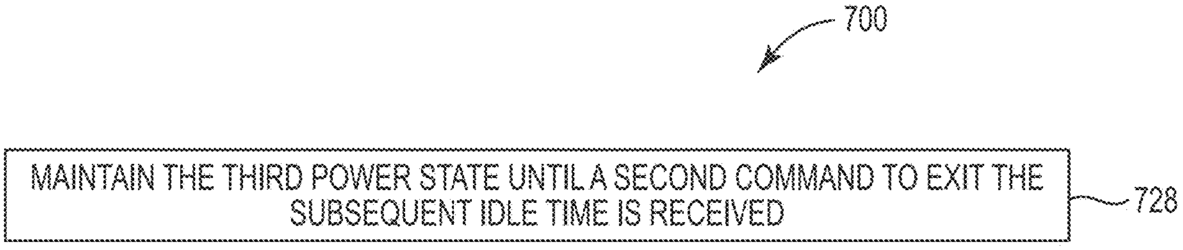

In response to predicting the subsequent idle time will be less than the threshold time, as illustrated in FIG. 7D at 720, the controller may further in response to a first command to enter the subsequent idle time, transition to a first power state (e.g., transition to the L1.5 power state at time $t_1$ in FIG. 5A). At 722, the controller may further transition to a second power state higher than the first power state in response to the threshold time elapsing (e.g., transition to the L1 (BKOPs) power state at time $t_2$ in response to the threshold time 504 elapsing in FIG. 5A). At 724, the controller may further run background operations in the second power state (e.g., between time $t_2$ and time $t_3$ of FIG. 5A). At 726, the controller may further in response to completing the background operations, transition to a third power state lower than the first power state (e.g., transition to the L2 power state at time $t_3$ in FIG. 5A). As illustrated in FIG. 7E at 728, the controller may further maintain the third power state until a second command to exit the subsequent idle time is received (e.g., a subsequent command to return to the active power state or to transition to a hibernate or sleep state).

Figure 7F:
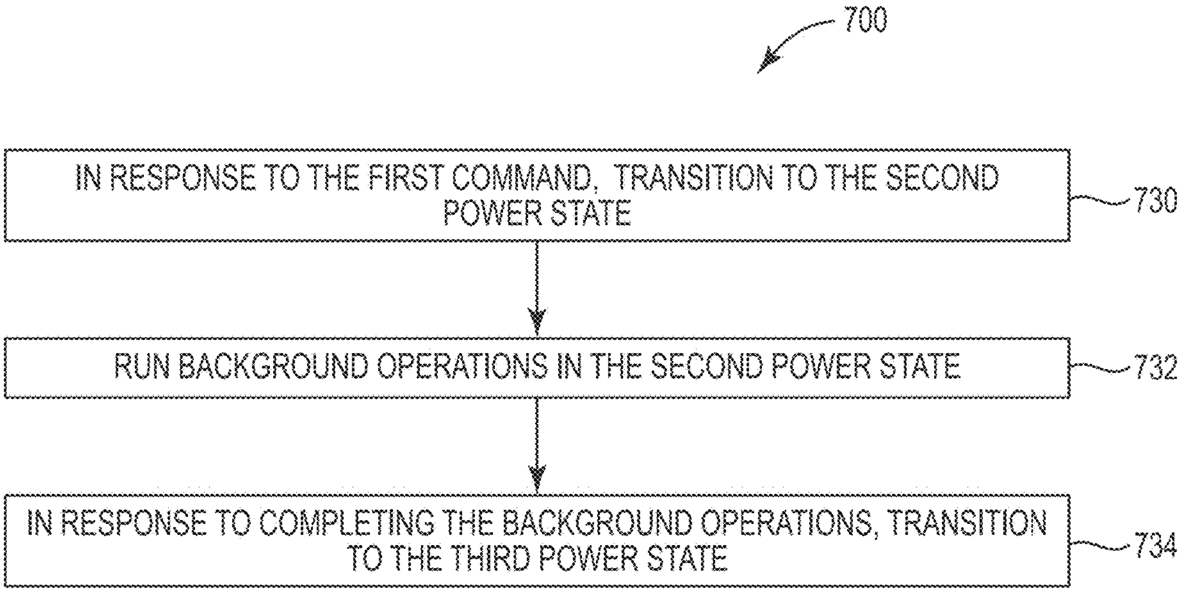

In response to predicting the subsequent idle time will be greater than the threshold time, as illustrated in FIG. 7F at 730, the controller may further in response to the first command, transition to the second power state (e.g., transition to the L1 (BKOPs) power state at time $t_1$ in FIG. 5B). At 732, the controller may further run background operations in the second power state (e.g., between time $t_1$ and time $t_2$ of FIG. 5B). At 734, the controller may further in response to completing the background operations, transition to the third power state (e.g., transition to the L2 power state at time $t_2$ in FIG. 5B).

Figure 8A:
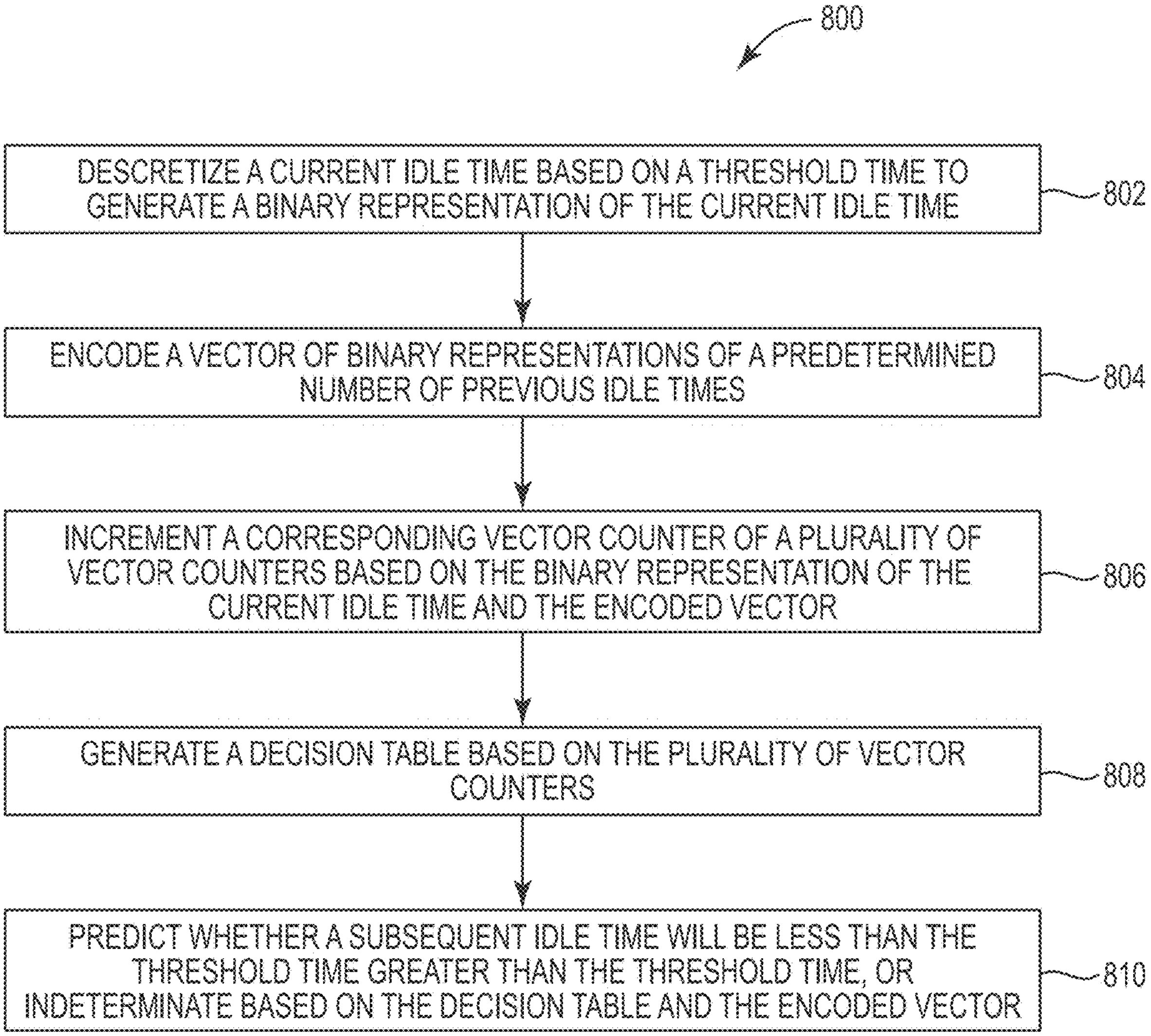
FIGS. 8A-8C are flowcharts of a method for predicting idle times in accordance with another embodiment.
Figure 8B:
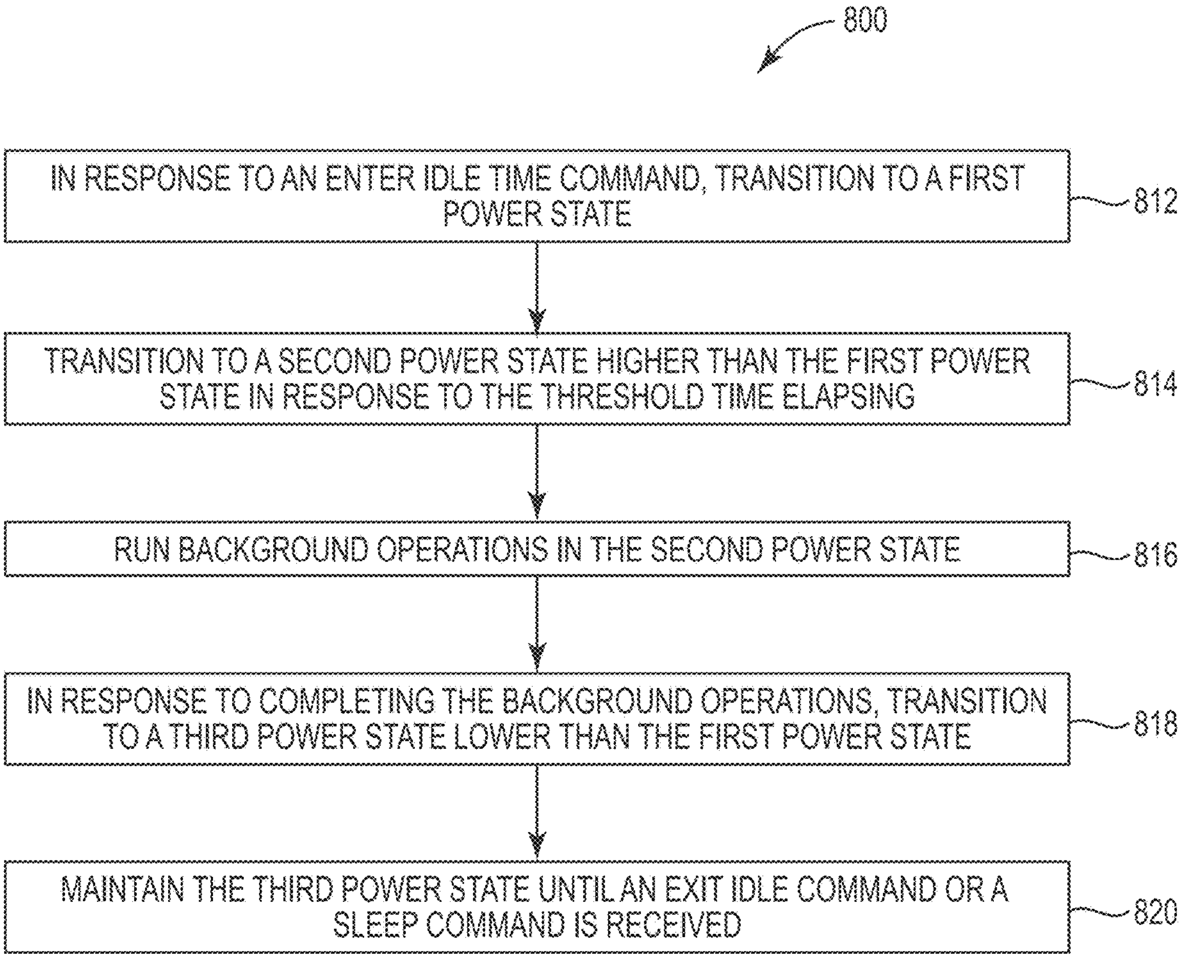
Figure 8C:
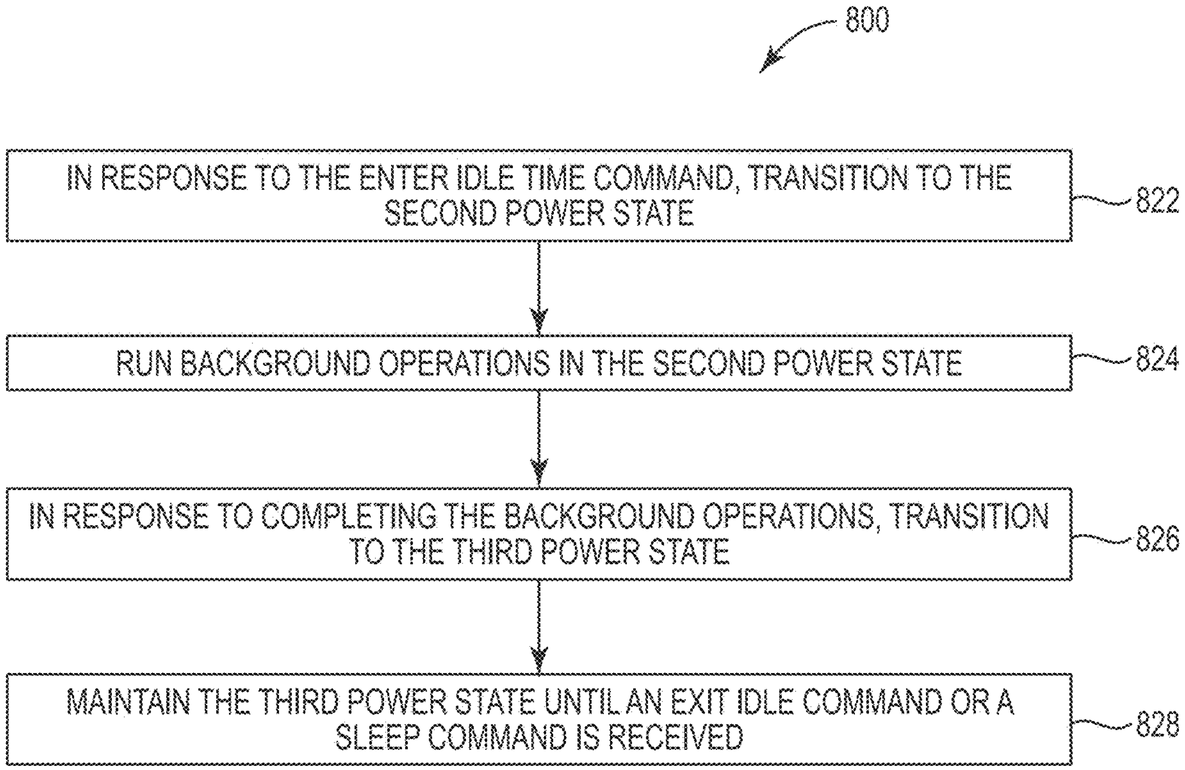

FIGS. 8A-8C are flowcharts of a method 800 for predicting idle times in accordance with another embodiment. Method 800 may correspond at least in part to FIGS. 1-5C. For example, FIGS. 8A-8C might represent a method for predicting idle times for memory device 100 of FIG. 1. The method might be in the form of computer-readable instructions, e.g., stored to a memory of processor 130 of FIG. 1. Such computer-readable instructions might be executed by a controller, e.g., the processor 130, to cause the memory device 100 to perform the method.

Method 800 might be implemented within a flash storage device (e.g., 100) including an array of memory cells (e.g., 104) and a controller (e.g., 130) configured to access the array of memory cells as previously described at least with reference to FIG. 1. In some examples, the flash storage device includes a UFS device.

As illustrated in FIG. 8A at 802, the controller may discretize a current idle time based on a threshold time to generate a binary representation of the current idle time (e.g., via threshold comparator 406 of FIGS. 4A). At 804, the controller may encode a vector of binary representations of a predetermined number of previous idle times (e.g., via vector encoder 410 of FIG. 4A). In some examples, the predetermined number includes at least three. At 806, the controller may increment a corresponding vector counter of a plurality of vector counters based on the binary representation of the current idle time and the encoded vector (e.g., via vector counters 412 of FIGS. 4A and 4B). At 808, the controller may generate a decision table based on the plurality of vector counters (e.g., decision table 416 of FIG. 4A). At 810, the controller may predict whether a subsequent idle time will be less than the threshold time, greater than the threshold time, or indeterminate based on the decision table and the encoded vector.

In response to predicting the subsequent idle time will be less than the threshold time, as illustrated in FIG. 8B at 812, the controller may further in response to a first command, transition to a first power state (e.g., transition to the L1.5 power state at time $t_1$ in FIG. 5A). At 814, the controller may further transition to a second power state higher than the first power state in response to the threshold time elapsing (e.g., transition to the L1 (BKOPs) power state at time $t_2$ in response to the threshold time 504 elapsing in FIG. 5A). At 816, the controller may further run background operations in the second power state (e.g., between time $t_2$ and time $t_3$ of FIG. 5A). At 818, the controller may further in response to completing the background operations, transition to a third power state lower than the first power state (e.g., transition to the L2 power state at time $t_3$ in FIG. 5A). At 820, the controller may further maintain the third power state until an exit idle command or a sleep command is received.

In response to predicting the subsequent idle time will be greater than the threshold time, as illustrated in FIG. 8C at 822, the controller may further in response to the first command, transition to the second power state (e.g., transition to the L1 (BKOPs) power state at time $t_1$ in FIG. 5B). At 824, the controller may further run background operations in the second power state (e.g., between time $t_1$ and time $t_2$ of FIG. 5B). At 826, the controller may further in response to completing the background operations, transition to the third power state (e.g., transition to the L2 power state at time $t_2$ in FIG. 5B). At 828, the controller may further maintain the third power state until an exit idle command or a sleep command is received.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments.

What is claimed is:

1. A flash storage device comprising:

an array of memory cells; and a controller configured to access the array of memory cells, wherein the controller is further configured to:

- generate a representation of a current idle time having a first value in response to the current idle time being less than a threshold time and having a second value in response to the current idle time being greater than the threshold time;
- maintain a current sequence of a predetermined number of previous idle time representations;
- maintain a plurality of counter pairs, each counter pair corresponding to a different potential sequence of the predetermined number of previous idle time representations;
- increment a first counter of the counter pair corresponding to the current sequence in response to the current idle time having the first value and increment a second counter of the counter pair corresponding to the current sequence in response to the current idle time having the second value; and
- predict whether a subsequent idle time will be less than the threshold time, greater than the threshold time, or indeterminate based on the current sequence and the counter pair corresponding to the current sequence,
- wherein the controller is further configured to, in response to predicting the subsequent idle time will be less than the threshold time;
  - in response to a first command for the subsequent idle time, transition to a first power state;
  - transition to a second power state higher than the first power state in response to the threshold time elapsing;
  - run background operations in the second power state; and
  - in response to completing the background operations, transition to a third power state lower than the first power state.

2. The flash storage device of claim 1, wherein the controller is further configured to generate the representation of the current idle time to have the first value in response to the current idle time being equal to the threshold time.

3. The flash storage device of claim 1, wherein the controller is further configured to predict the subsequent idle time will be less than the threshold time in response to a count of the first counter being greater than a count of the second counter by a threshold value for the counter pair corresponding to the current sequence, predict the subsequent idle time will be greater than the threshold time in response to the count of the second counter being greater than the count of the first counter by the threshold value for the counter pair corresponding to the current sequence, and predict the subsequent idle time will be indeterminate in response to the count of the first counter being within the threshold value of the count of the second counter for the counter pair corresponding to the current sequence.

4. The flash storage device of claim 1, wherein the controller is further configured to maintain the third power state until a second command to exit the subsequent idle time is received.

5. The flash storage device of claim 1, wherein the controller is further configured to, in response to predicting the subsequent idle time will be greater than the threshold time:

in response to the first command, transition to the second power state;

run background operations in the second power state; and in response to completing the background operations, transition to the third power state.

6. A flash storage device comprising:

an array of flash memory cells; and a controller configured to access the array of flash memory cells, wherein the controller is further configured to:

discretize a current idle time based on a threshold time to generate a binary representation of the current idle time;

encode a vector of binary representations of a predetermined number of previous idle times;

increment a corresponding vector counter of a plurality of vector counters based on the binary representation of the current idle time and the encoded vector;

generate a decision table based on the plurality of vector counters;

predict whether a subsequent idle time will be less than the threshold time, greater than the threshold time, or indeterminate based on the decision table and the encoded vector; and in response to predicting the subsequent idle time will be less than the threshold time:

in response to a first command, transition to a first power state;

transition to a second power state higher than the first power state in response to the threshold time elapsing;

run background operations in the second power state;

in response to completing the background operations, transition to a third power state lower than the first power state; and maintain the third power state until an exit idle command or a sleep command is received.

7. The flash storage device of claim 6, wherein the controller is further configured to, in response to predicting the subsequent idle time will be greater than the threshold time:

in response to the first command, transition to the second power state;

run background operations in the second power state;

in response to completing the background operations, transition to the third power state; and maintain the third power state until an exit idle command or a sleep command is received.

8. The flash storage device of claim 6, wherein the predetermined number comprises at least three.

9. A flash storage device comprising:

an array of memory cells; and a controller configured to access the array of memory cells and manage power of the flash storage device, wherein the controller comprises:

a threshold comparator to generate a current idle time representation indicating whether a current idle time is less than or equal to a threshold time or greater than the threshold time;

a shift register to store a predetermined number of previous idle time representations;

a vector encoder to generate an encoded vector representing a current sequence of the predetermined number of previous idle time representations stored in the shift register;

a plurality of vector counters, each vector counter of the plurality of vector counters corresponding to a different potential sequence of the predetermined number of previous idle time representations, wherein a vector counter of the plurality of vector counters corresponding to the encoded vector is incremented based on the current idle time representation; and prediction logic to output a prediction for a subsequent idle time based on the encoded vector and the vector counter corresponding to the encoded vector, wherein the controller is further configured to, in response to predicting the subsequent idle time will be less than the threshold time:

in response to a first command, transition to a first power state;

transition to a second power state higher than the first power state in response to the threshold time elapsing;

run background operations in the second power state;

in response to completing the background operations, transition to a third power state less than the first power state; and maintain the third power state until an exit idle command or a sleep command is received.

10. The flash storage device of claim 9, wherein the prediction logic comprises conversion logic to generate a decision table indicating the prediction for the subsequent idle time for each potential sequence of the predetermined number of previous idle time representations.

11. The flash storage device of claim 10, wherein the prediction logic further comprises:

a sample counter to count idle times; and a sample size comparator to enable the conversion logic in response to a count of the sample counter being greater than or equal to a count threshold.

12. The flash storage device of claim 11, wherein the sample size comparator resets the plurality of vector counters after enabling the conversion logic.

13. The flash storage device of claim 9, wherein the controller is further configured to, in response to predicting the subsequent idle time will be greater than the threshold time:

in response to the first command, transition to the second power state;

run background operations in the second power state;

in response to completing the background operations, transition to the third power state; and maintain the third power state until an exit idle command or a sleep command is received.

14. The flash storage device of claim 9, wherein the flash storage device comprises a universal flash storage (UFS) device.

15. The flash storage device of claim 9, wherein the prediction logic predicts whether the subsequent idle time will be less than the threshold time, greater than the threshold time, or indeterminate based on the encoded vector and the vector counter corresponding to the encoded vector.

16. A flash storage device comprising:

an array of memory cells; and a controller configured to access the array of memory cells and manage power of the flash storage device, wherein the controller comprises:

a threshold comparator to generate a current idle time representation indicating whether a current idle time is less than or equal to a threshold time or greater than the threshold time;

a shift register to store a predetermined number of previous idle time representations;

a vector encoder to generate an encoded vector representing a current sequence of the predetermined number of previous idle time representations stored in the shift register;

a plurality of vector counters, each vector counter of the plurality of vector counters corresponding to a different potential sequence of the predetermined number of previous idle time representations, wherein a vector counter of the plurality of vector counters corresponding to the encoded vector is incremented based on the current idle time representation; and prediction logic to output a prediction for a subsequent idle time based on the encoded vector and the vector counter corresponding to the encoded vector, wherein the controller is further configured to, in response to predicting the subsequent idle time will be indeterminate, in response to a first command, transition to a first power state;

transition to a second power state higher than the first power state in response to a further threshold time elapsing;

run background operations in the second power state; and in response to completing the background operations, transition to a third power state less than the first power state.

17. The flash storage device of claim 16, wherein the further threshold time is different from the threshold time.

18. The flash storage device of claim 16, wherein the prediction logic comprises conversion logic to generate a decision table indicating the prediction for the subsequent idle time for each potential sequence of the predetermined number of previous idle time representations.

19. The flash storage device of claim 18, wherein the prediction logic further comprises:

a sample counter to count idle times; and a sample size comparator to enable the conversion logic in response to a count of the sample counter being greater than or equal to a count threshold.

* * * * *